United States Patent
Guo et al.

(10) Patent No.: US 8,108,439 B2
(45) Date of Patent: Jan. 31, 2012

(54) METHOD AND DEVICE FOR DISPLAYING AND BROWSING A MULTI-FACETED DATA SET

(75) Inventors: Hong Lei Guo, Beijing (CN); Zhili Guo, Beijing (CN); Zhong Su, Beijing (CN); Xian Wu, Beijing (CN); Xiao Xun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/261,382

(22) Filed: Oct. 30, 2008

(65) Prior Publication Data

US 2009/0119262 A1    May 7, 2009

(30) Foreign Application Priority Data

Nov. 1, 2007  (CN) .......................... 2007 1 0167211

(51) Int. Cl.
*G06F 7/00* (2006.01)
*G06F 17/30* (2006.01)
(52) U.S. Cl. ......... 707/802; 707/807; 715/782; 715/848
(58) Field of Classification Search .......... 707/600–831; 715/757, 782, 848, 850, 852, 853
See application file for complete search history.

(56) References Cited

U.S. PATENT DOCUMENTS

| 5,671,381 A * | 9/1997 | Strasnick et al. ............. 715/848 |
| 6,226,669 B1 | 5/2001 | Huang et al. |
| 6,774,914 B1 | 8/2004 | Benayoun |
| 7,146,576 B2 | 12/2006 | Chang et al. |
| 2003/0081010 A1 * | 5/2003 | Chang et al. .................. 345/835 |

FOREIGN PATENT DOCUMENTS

| JP | 10105538 A2 | 5/1998 |
| JP | 2004355290 A2 | 12/2004 |
| WO | WO 03038679 A3 | 5/2003 |

OTHER PUBLICATIONS

Rossignac, Interactive exploration of distributed 3D databases over the Internet, Aug. 6, 2002, IEEE, 324-335.*

* cited by examiner

*Primary Examiner* — Jean B Fleurantin
(74) *Attorney, Agent, or Firm* — Vazken Alexanian

(57) ABSTRACT

This invention aims to provide a method and apparatus for displaying and/or browsing a multi-faceted data set containing hierarchical subject labels. In the present invention, subject labels can be located into a 3D space. Complex information, such as, the relationship between subject labels and weights of respective subject labels can be presented by displaying the 3D space. In this way, the screen size can be reduced and the user experience is improved.

16 Claims, 13 Drawing Sheets

Nobel Prize Winners

[Search]

| Gender | Prize |
|---|---|
| Female (33)  Male (698) | Chemistry (138)  Medicine (182) |
|  | Economics (55)  Peace (108) |
|  | Literature (101)  Physics (166) |
| Country |  |
| Argentina (5)  China (2) | Year |
| Australia (6)  Columbia (1) | 1900s (57)  1960s (79) |
| Austria (12)  Costa Rica (1) | 1910s (40)  1970s (103) |
| Belgium (11)  Czechoslovakia (2) | 1920s (54)  1980s (97) |
| Burma (1)  Denmark (13) | 1930s (56)  1990s (98) |
| Canada (9)  more... | 1940s (43)  2000s (56) |
| Chile (2) | 1950s (72) |

North America(318)

Europe(444) Asia(31)

Pacific(13)

Africa(14)

Latin America(13)

FIG. 8

Palestine(1)

Iran(3)

Korea(1)
China(2)
Pakistan(1) Japan(12)
India(5)

Bangladesh(2)

Burma(1)

Vietnam(1)

East Timor(2)

METHOD AND DEVICE FOR DISPLAYING AND BROWSING A MULTI-FACETED DATA SET

CROSS-REFERENCE TO RELATED APPLICATIONS

This application claims priority under 35 U.S.C. §119 from Chinese Patent Application No. 200710167211.4 filed Nov. 1, 2007, the entire contents of which are incorporated herein by reference.

BACKGROUND OF THE INVENTION

1. Field of the Invention

The present invention relates to displaying and/or browsing a data set in a multi-faceted way. In particular, to a method and device for 3D displaying and/or browsing a data set from multiple facets each of which is a hierarchy of subject labels.

2. Description of the Related Art

Metadata is information about information. In many cases, a set of hierarchical subject labels is used as metadata for categorizing resources, e.g., Yahoo Directory and ODP (Open Directory Project). A multi-faceted browsing interface introduces multiple orthogonal sets of hierarchical subject labels to categorize resources and enables the user to narrow the scope of resources from different points of view via selecting subject labels in different facets. Multi-faceted browsing has been proven an efficient and interactive way to access resources and has been implemented for browsing a lot of web resources. For example, in some mp3 repository web sites, songs are categorized by artists, genres, region, length, etc. The user can select subject labels under these facets to narrow the scope and find songs of his/her interest. For example, if the user selects the "Region" facet, the subject labels like "North America", "Europe", etc. under the "Region" facet are displayed, and the user can select one certain subject label to narrow the searching scope from this geography facet.

In most multi-faceted browsing interfaces, subject labels under the same parent node are displayed as a text list and ranked by the number resource items under them. This kind of approaches has two major disadvantages: first, this straight list style display is not capable of demonstrating complex information, i.e., relationships between subject labels, the relativities between subject labels and user's profile, etc.; second, when there are too many subject labels under a facet category, the list will become too long for the screen to display and this disadvantage will become even worse in small screen devices such as mobile phones.

To illustrate the above disadvantages, the Flamenco Search Interface (see http://flamenco.berkely.edu/demos.html, which is accessible as of Jan. 24, 2011) has implemented a multi-faceted browsing interface on the data set of Nobel Prize Winners, as shown in FIG. 1, which provides data searching for Nobel Winners over the past years from many facets (including "Gender", "Prize", "Country", "Year"). In FIG. 1, the subject labels under each facet are displayed as a text list. For example, under the facet "Country", subject labels "America", "China", "Japan", etc (countries owning prize winners) are displayed as a list; under the facet "Year", subject labels "1910-1920", "1920-1930", etc. (when the prizes were awarded) are displayed as a list; under the facet "Prize", subject labels such as prize types "Physics", "Chemistry", etc, are listed. The above-mentioned solution cannot display complex information, such as, which subject label is more important or the relationships between the subject labels. For example, the relativities between countries can be represented by the geographical distances between their capitals but the list display style is not complex enough to represent such information. Also, the list is too long to be displayed in a small screen. Although a number of solutions have been proposed to improve multi-faceted browsing interface usage in a screen of small size, they are mostly 2D based solutions and cannot represent the complex information mentioned above.

SUMMARY OF THE INVENTION

The present invention provides a solution for displaying and/or browsing a data set in multi faceted way. In the solution, a plurality of subject labels can be allocated in a 3D space. Through a 3D view, complex information, such as relationships between the subject labels and weights of subject labels, can be represented by their location in 3D space. First, for the sake of clarity, some definitions are introduced as follows and will be discussed subsequently.

Facet: A facet is a set of hierarchical (layered) subject labels, which is also metadata for describing resources.

Subject Label: A subject label is a node in the hierarchy. Subject labels can be used to categorize resources in terms of subjects.

Resource: A resource refers to content to be browsed via a multi-faceted interface.

Resource Item: A resource item is a unit of the resource.

One embodiment of the present invention provides a 3D multi-faceted browsing solution. In the 3D multi-faceted browsing solution a plurality of subject labels under one facet are allocated into a 3D space and displayed to the user. In this way, complex information (such as relationships between subject labels and weights of subject labels) can be displayed. Further, this approach helps to reduce the screen size occupied by displaying the information.

In a further aspect, the user's viewpoint can be moved in the displayed 3D space.

In a further aspect, the user can click a certain subject label to view sub-labels/resource items thereof.

In a further aspect, a smooth switch can be made between different facets so that user can browse the resources in a highly interactive way in the 3D space.

Another embodiment of the present invention provides a displaying method which can be applied to a multi-faceted data set containing hierarchical (layered) subject labels. The method includes the following steps: allocating the subject labels in any subset of the multi-faceted data set into the 3D space based on metadata information; and displaying a view of the 3D space into which the subject labels have been allocated. The metadata information includes at least one of the following information: hierarchy of subject labels of the multi facet dataset, relationships between respective subject labels of a same layer, and weights of respective subject labels.

In a further aspect, the relationship between the subject labels is the degree of relativity between the subject labels, measured in terms of the same characteristic.

In a further aspect, the weight of the subject label is the degree of importance of the subject label, measured in terms of the same characteristic.

In a further aspect, the step of allocating the subject labels into the 3D space further includes determining distances between respective subject labels in the 3D space based on the relationship between respective subject labels.

In a further aspect, the step of allocating the subject labels into the 3D space further includes determining distances between the subject labels and the user's viewpoint in 3D space based on the weights of the subject labels.

Another embodiment of the present invention provides a displaying device applied to a multi-faceted data set containing hierarchical (e.g., layered) subject labels. The displaying device includes: a 3D display allocation arranger for allocating subject labels in any subset of the multi-faceted data set into a 3D space on the basis of metadata information of the multi-faceted data set; and a display unit for displaying a view of the 3D space into which the subject labels have been allocated. The metadata information includes at least one of the following information: hierarchy of subject labels of the multi-faceted data set, relationships between respective subject labels of a same layer, and weights of respective subject labels.

Another embodiment of the present invention provides a browsing device for a multi-faceted data set containing hierarchical (e.g., layered) subject labels. The browsing device includes: a user-input unit for receiving user input; a resource repository for storing the multi-faceted data set containing hierarchical subject labels; a search engine for searching the resource repository via the user-input unit and outputting a subset of the multi-faceted data set as an output; a 3D display allocation arranger for receiving the output of the search engine and allocating subject labels of the subset of the multi-faceted data set into a 3D space based on metadata information of the multi-faceted data set; and a display unit for displaying a view of the 3D space into which the subject labels have been allocated. The metadata information includes at least one of the following information: hierarchy of subject labels of the multi-faceted data set, relationships between respective subject labels of a same layer, and weights of respective subject labels.

BRIEF DESCRIPTION OF THE DRAWINGS

An exemplary method and device are illustrated with reference to the drawings wherein the same reference signs are used to denote the same element. In the following description, for the sake of clarity, specific details are illustrated to facilitate fully understanding the method and device. However, these embodiments could be implemented without these specific details. In other embodiments, to simplify the description, common structures and devices are shown as block diagrams. Those skilled in the art can conceive many modifications and other embodiments based on the teaching as stated in the description and drawings. Therefore, the present invention is not limited to the disclosed specific embodiments. Other alternative embodiments should be included in the scope of the invention and the inventive concept. Although specific terms are used in the text, they are only used for general description rather than for the purpose of any limitation.

FIG. 1 shows a browsing device in the prior art which could be used in a multi-faceted data set.

FIGS. 7-8 show a 3D view of Embodiment 1 of the invention.

DETAILED DESCRIPTION OF PREFERRED EMBODIMENTS

Embodiments of the present invention provide a displaying method and a displaying device for any data having a multi-faceted hierarchical structure. The method and device can automatically display a 3D view of any data set having a multi-faceted structure.

Figure 2A:
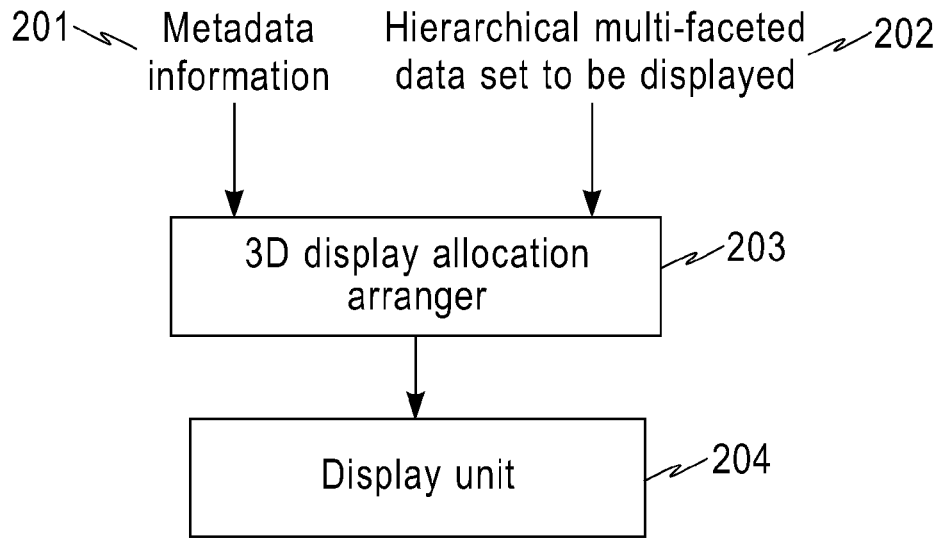
FIG. 2A shows a displaying device of the present invention used for a multi-faceted data set.

Referring to FIG. 2A, the device includes a 3D display allocation arranger 203 and a display unit 204. The 3D display allocation arranger 203 receives metadata information 201; this metadata information 201 is related to a multi-faceted hierarchical data set 202 to be displayed and includes at least one of the following: facet hierarchy of the multi-faceted data set, relationships between subject labels, and weights of subject labels. The 3D display allocation arranger 203 further receives any subset of the multi-faceted hierarchical data set 202, and allocates the multi-faceted hierarchical data subset 202 into a 3D space based on the metadata information 201 (this will be further explained in detail with reference to the embodiments), then the resultant 3D space view is displayed on the display unit 204.

The display unit 204 could be a conventional display with a 2D screen. It could also be, for example, a projector, or the like, which can project a 3D image so that the 3D space output from the 3D display allocation arranger 203 can be directly displayed rather than mapped to a 2D screen. Moreover, the display unit 204 can include other well-known functions in the field of image processing, e.g., various processing relating to 3D visualization.

Figure 2B:
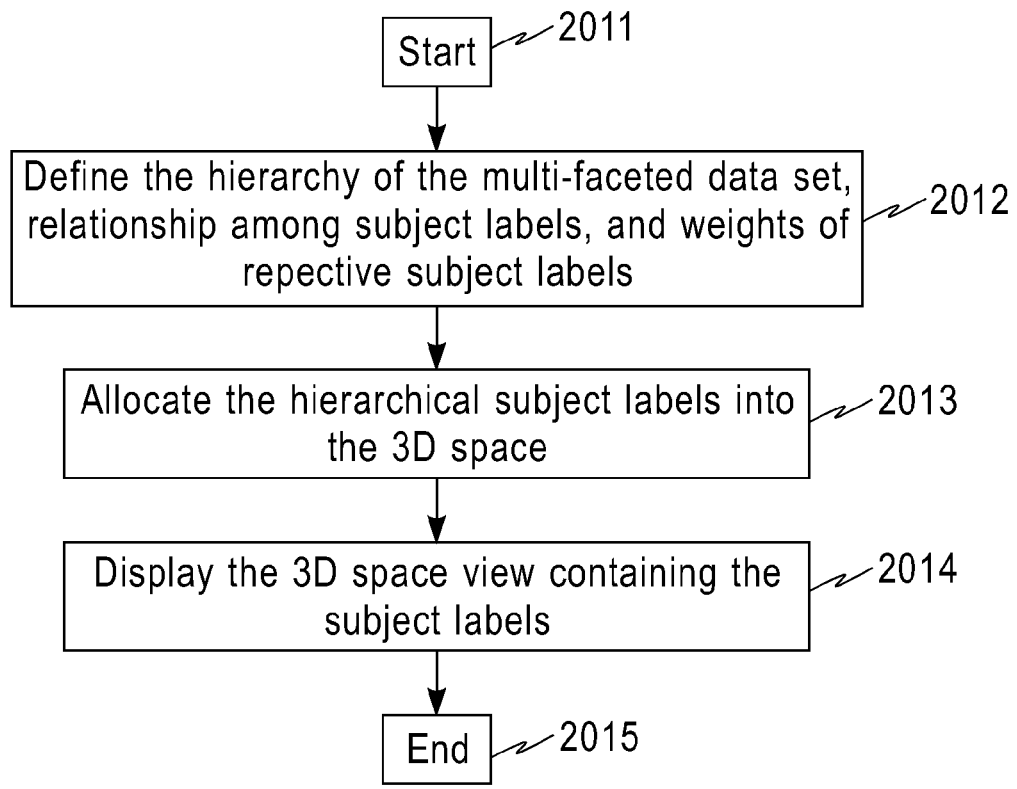
FIG. 2B shows a displaying method of the present invention used for a multi-faceted data set.

FIG. 2B shows a flow chart of a 3D visualization method for a multi-faceted data set.

The method begins with step 2011 and proceeds to step 2012 to define the metadata information of the multi-faceted data set, the metadata information comprising at least one of the following information:

facet hierarchies, including subject labels under each facet, sub labels (if any) under each subject label, and finally resource items under each subject label. For example, the hierarchical structure can be a tree-like structure;

relationships between subject labels at the same layer, which can be quantified and calculated in terms of certain predefined attributes (such as similarity, distance, etc.); and weights of subject labels that can be interpreted as: a degree of importance, a degree of relativity with user interest, etc.

The above-mentioned several types of metadata are only illustrative rather than restrictive. The 3D display solution proposed by the present invention can display additional complex information, such as, the above-mentioned relationships and weights, when compared with the prior-art 2D display. However, those skilled in the art can define by themselves any other metadata information repository based on need. In the following, it will further explain how to define metadata in combination with embodiments.

Next, in step 2013, any subset of the multi-faceted data set is allocated into the 3D space based on said metadata information. During the process of allocating subject labels into the 3D space, the subject labels are allocated in a visually distinguishable way based on the previously defined metadata information. For example, distances between subject labels reflect the relationships between subject labels, and different distances between the subject labels and a user's viewpoint reflect different weights. In the following, it will further explain the 3D allocation process in combination with the embodiments.

Moreover, or alternatively, different sizes, brightness, colors, shadows and other visual effects are allocated to subject labels according to different weights, thereby providing a means to visually distinguish the subject labels. These visual differences more easily reflect the complex information, such as, the relationships between the subject labels and weights thereof. Moreover, the above-mentioned different visual effects (i.e., distances, sizes, brightness, colors and shadows etc. of subject labels) could correspond to not only one of the metadata information, but also to any combination of the metadata information.

Finally, in step 2014, the 3D space view is displayed to user, and this process ends in step 2015.

Step 2012, which defines the metadata information, is not an essential part of the method of the present invention. The metadata information can be predefined, stored, and directly accessed and obtained in step 2013.

After generating the above 3D visualization view, it is possible for the user to perform, by various well known 3D visualization techniques, additional operations in the 3D view; including moving backward/forward/leftward/rightward, zoom-in, zoom-out, etc.

The present invention is also applicable to an ordinary multi-faceted data set. Specifically, even if the multi-faceted data set doesn't define relationships between the subject labels or weights of subject labels, the subject labels in the multi-faceted data set can still be allocated into the 3D space and displayed to the user. The 3D space allocation process can be performed using various methods, including randomized allocation. Moreover, any visual effects, including size, brightness, color, shadow, etc. can be used to visually distinguish the subject labels from one another. Compared with the list display in the prior-art, the 3D display of the present invention can provide a better user experience, and in particular, it could be used in displaying devices with a small screen size, such as mobile phones and PDAs.

Additional embodiments of the present invention further provide a 3D browsing method and device for a multi-faceted data set. The following will describe additional preferred embodiments of the present invention with reference to FIGS. 3A-3B; wherein the displaying method and device as shown in FIGS. 2A-2B are included.

Figure 3A:
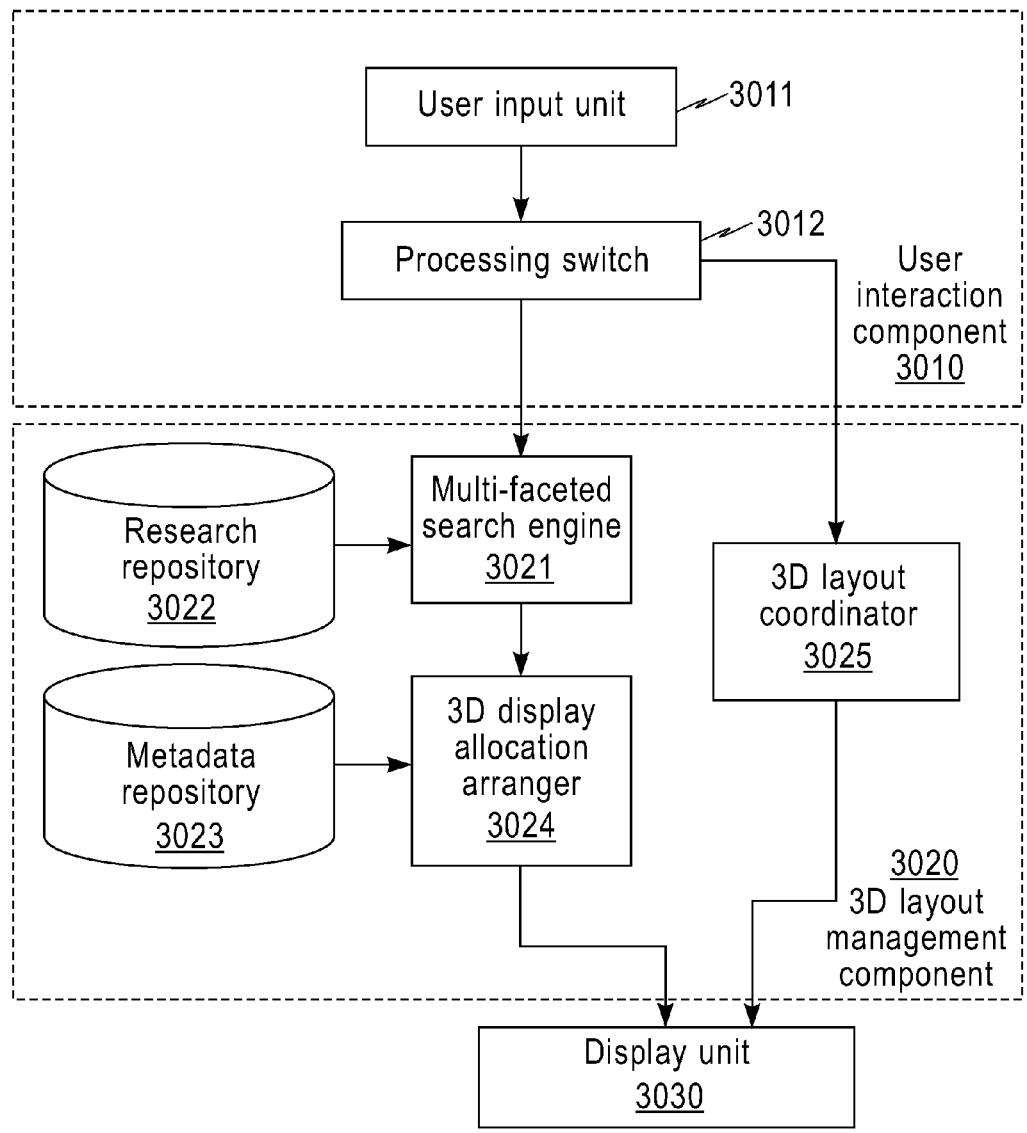
FIG. 3A shows a browsing device of the present invention used for a multi-faceted data set.

FIG. 3A shows a 3D browsing device for a multi-faceted data set. The device has the following signal flows—Input: user operations, which at least include a query operation by the user, a 3D display operation of the query result, etc.; Output: a 3D display of the multi-faceted data set.

The 3D multi-faceted browsing device includes a user interaction component 3010, a 3D layout management component 3020 and a display component 3030.

The user interaction component 3010 is an intermediate layer between the user and the 3D layout management component 3020. It includes a user input unit 3011 and a processing switch 3012. The user input includes mouse events, keyboard events, and search keywords input by the user, etc. The user operations from the user input unit 3011 are sent to the processing switch 3012. The processing switch 3012 classifies the valid operations into two types: a first type, where it is necessary to download new items from a resource repository 3022 and generate a new 3D display, for example, user inputs a new keyword search, or user switches to other facets; a second type, where it only modifies the 3D view of current displayed items, for example, user performs zoom-in, zoom-out or other moving operations in the 3D space.

The 3D layout management component 3020 includes: a resource repository 3022, a multi-faceted searching engine 3021, a metadata information repository 3023, a 3D display allocation arranger 3024, and a 3D layout coordinator 3025.

The resource repository 3022 could be a database or a file implemented in various ways wherein resource items categorized according to facets are saved. For instance, a data set including all the Nobel Winners is a resource repository wherein data related to the winners are categorized according to facets such as "Country", "Year", "Prize" etc. Each facet may have one or more layers so that the resource repository 3022 can be implemented as a hierarchical tree-like structure. It should be appreciated, the term "resource repository" used in this text refers to a physical and/or logical entity which can store data. For example, the resource repository can be one or more of the following: list, table, file, data storage, relationship database, data table, array, stack, etc. The resource repository 3022 can reside in a logical and/or physical entity, and/or be allocated between two or more logical and/or physical entities. The term "resource repository" can further be understood as including a database management system for controlling the organization, storage and searching of data in the database.

The multi-faceted search engine 3021 can search the resource repository 3022 based on user input using any known searching techniques. The multi-faceted search engine 3021 can carry out single-facet/multi-faceted searching in various ways. The search result includes a subset of the multi-faceted data set. The subset itself may include a hierarchy of subject labels and relationships thereof, any matched resource items, etc. According to a preferred embodiment of the present invention, if the multi-faceted data set is a tree-like data structure, the search result can be a sub-tree.

The metadata information repository 3023 can be defined by user. The metadata information repository 3023 defines at least one of the following information: hierarchical subject labels under each facet, relationships between subject labels and weights of each subject label. The specific contents of the repository 3023 are predefined by the user based on demand. The following will explain more details with reference to embodiments.

The 3D display allocation arranger 3024 receives any search result, and allocates the search result into a 3D space based on the metadata information. The following will explain the 3D space allocation process with reference to embodiments.

The 3D display allocation arranger 3024 outputs any processing results to the display unit 3030, thereby the resultant 3D space is mapped to a screen of a 2D display unit 3030.

If the user input is an operation of the second type instead of a new search, for example, adjusting/modifying an existed 3D display, the processing switch 3012 sends the user's moving operation in the 3D space to the 3D layout coordinator 3025. The 3D layout coordinator 3025 only modifies the existing 3D view without loading any new item. The 3D view is re-displayed on the display screen of the display unit 3030 (this will be explained in detail with reference to the embodiments). The user may instruct to superpose an additional view on the current 3D view, for example, an operation menu, a history of operations, etc.

The display unit 3030 can be a conventional display with a 2D display screen. However, as understood by those skilled in the art, the display unit 3030 could be a display of any other type. For example, a projector which can project a 3D image so that the 3D space view from the 3D display allocation arranger 3024 can be directly displayed.

Figure 3B:
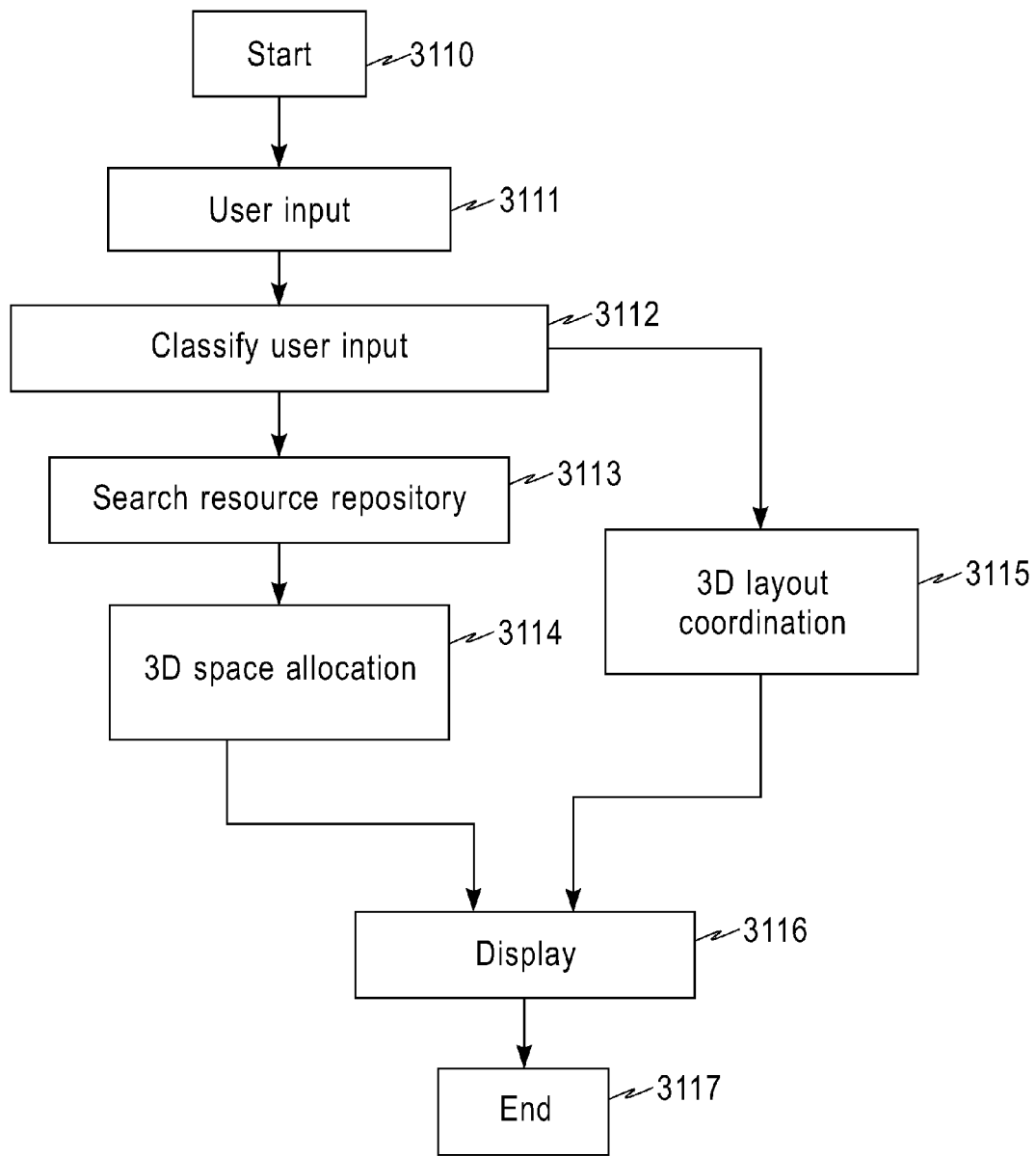
FIG. 3B shows a browsing method of the present invention used for a multi-faceted data set.

FIG. 3B further shows a 3D browsing method of the present invention for a multi-faceted data set.

After step 3110 starts, user input is received in step 3111.

In step 3112, user input is classified into two types: a first type, where it is necessary to load new items from a resource repository and generate a new 3D display, for example, user inputs a new keyword search, or user instructs to switch to other facets; a second type, where it only modifies/adjusts the currently existed 3D view, for example, user performs zoom-in, zoom-out or other moving operations in the 3D space.

When it is determined that user input is an input of first type, step 3113 is performed wherein the resource repository is searched based on user input. The search result can be a subset of the multi-faceted data set. The subset can include hierarchies (e.g., layers) of subject labels, relationships between subject labels, matched resource items, etc.

In step 3114, the search result is allocated into the 3D space based on metadata information. As described above, the metadata information includes at least one of the following: hierarchical (layered) subject labels under each facet of the multi-faceted data set, relationships between subject labels, and weights of subject labels.

In step 3116, the 3D space view generated in step 3114 is displayed.

On the other hand, when it is determined that user input is of the second type in step 3112, step 3115 is performed. For example, when user input instructs to move (i.e., the user's viewpoint) in the shown 3D space, the existing 3D view is adjusted in step 3115 and is displayed to the user in step 3116. Alternatively, when user input instructs to superpose an operation menu or a history of operations on the 3D space, the requested menu or history information is superposed on the existed 3D view in step 3115 and displayed to user in step 3116. After step 3116, the process ends in 3117.

In the following descriptions, the 3D displaying and/or browsing solution for the multi-faceted data set proposed in the embodiments of the present invention are discussed in detail with reference to Embodiment 1 and Embodiment 2.

Embodiment 1

Embodiment 1 of the present invention implements the above-mentioned 3D multi-faceted browsing device for a data set of the Nobel winners from 1901 to 2007 (including 801 winners).

The data set of the Nobel winners is classified into 4 facets:

Region: geographical area, including hierarchy of continent and country

Gender: gender of winner

Award: subject of award, such as physics, chemistry, etc.

Date: year of the award

Each facet can have a plurality of layers based on demand. For example, a subject label of a layer immediately under the "Region" facet is a continent, a subject label of a layer under a continent is a country, and a resource item in a layer under a country is a Nobel winner; There is only one layer of subject labels under "Gender", which includes subject labels "male" and "female", and under the layer "male" and "female" there are resource items, i.e., Nobel winners.

The hierarchy of a facet can be predefined in various ways. Taking the facet "Region" as an example, user defines subject labels in the first layer under the facet "Region" as "Asia", "Europe", "North America", "Latin America", "Pacific", "Africa", etc. User further defines subject labels under the subject label "Asia", including "China", "Japan", "Korea", . . . , "Vietnam", etc. Then, resource items are defined under the subject label "China", e.g., Chinese Nobel winners "Zhengning Yang" and "Zhengdao Lee". Other subject labels and resource items can be defined in a similar way.

Moreover, the above definitions can be described in a general code language, for example, the hierarchical subject labels under the facet "Region" can be represented as:

```
– <configFile name = "facet-config" lastModified =
 "2007-10-19T15 : 52 : 03-00 : 00">
  – <facet name="region" displayname="Region">
    – <item name="asia" displayname="Asia">
      <item name="china" displayname="China" />
      <item name="japan" displayname="Japan" />
     ...
    </item>
    – <item name="europe" displayname="Europe">
   <item name="germany" displayname="Germany" />
      <item name="france" displayname="France" />
     ...
    </item>
    – <item name="na" displayname="North America">
      <item name="usa" displayname="USA" />
     ...
     ...
    </item>
```

Taking the facet "Date" as an example, the user can define subject labels under the facet "Date", i.e., years of "1900-1910", "1910-1920", "1920-1930", "2000-2007", etc. The above-defined code language may be presented as follows:

```
– <facet name="DATE" displayname="DATE">
  <item name="1900~1910" displayname="1900~1910"/>
  <item name="1910~1920" displayname="1910~1920"/>
  ...
</facet>
```

The user can also define information such as relationships between subject labels under the same facet and weights of subject labels.

Specifically, each subject label under each facet can be considered as a node, and relationships between subject labels at the same layer are defined. In Embodiment 1, there are 11 subject labels in the layer under the subject label "Asia", which are countries "China", "Korea", "Japan", "Bangladesh", . . . , "Vietnam", respectively. Moreover, distances between these countries can be taken as relationships between the respective subject labels.

For example, we may use the following standard code language to represent the relationships between "China" (subject label 1) and the other 10 countries (subject label 2 to subject label 11). The relationships are represented by the value of "Relation". The value of "Relation" can be calculated based on a distance between two countries, for example, the distance between China (subject label 1) and Korea (subject label 2) is quantified as 956, and the distance between China (subject label 1) and Japan (subject label 3) is quantified as 2098.

```
<!-- edges -->
- <edge source="1" target="2">
<data key="Relation">956.0</data>
</edge>
- <edge source="1" target="3">
<data key="Relation">2098.0</data>
</edge>
- <edge source="1" target="4">
<data key="Relation">3023.0</data>
</edge>
...
- <edge source="1" target="11">
<data key="Relation">3381.0</data>
</edge>
...
```

In this way, the relationship between any two subject labels can be defined.

Figure 4:
FIG. 4 shows how relationships between subject labels are mapped to a 2D view according to the invention.

Moreover, the above-defined relationships between countries can be shown as a 2D view. For instance, using the Spring Algorithm (Eades, P. (1984) "A Heuristic for Graph Drawing," Congressus Numerantium, pp. 149-160) the relationship between any two of the 11 countries under the facet "Asia" is presented as a 2D view based on "distance", as shown in FIG. 4.

Moreover, the weight, "Importance", of respective subject labels can be further defined. In this embodiment, "Importance" is determined by calculating the number of Nobel winners under each subject label. For example, there are two winners under the subject label "China", thus the value of "Importance" is 2; there is one winner under the subject label "Korea", thus the value of "Importance" is 1; there are 12 winners under the subject label "Japan", thus the corresponding value of "Importance" is 12. The code language may be represented as follows:

```
- <!-- nodes -->
- <node id="1">
<data key="name">China</data>
<data key="importance">2</data>
</node>
- <node id="2">
<data key="name">Korea</data>
<data key="importance">1</data>
</node>
- <node id="3">
<data key="name">Japan</data>
<data key="importance">12</data>
</node>
...
- <node id="11">
<data key="name">Vietnam</data>
<data key="importance">1</data>
</node>
```

The above hierarchies and layers, relationships between subject labels and weights of respective subject labels can all be predefined by user as metadata and stored in the metadata repository 3023.

After receiving a search keyword input by the user input unit 3011, the processing switch 3012 sends it to a multi-faceted search engine 3021. The multi-faceted search engine 3021 searches the resource repository 3022 based on the keyword and obtains a search result. In association with this keyword, the result includes: hierarchy of subject labels, relationships of subject labels, and any matched resource items, etc. If the multi-faceted data set is implemented as a tree-like structure, the search result could be a sub-tree.

One difference between the present invention and the prior art is that the above search result is not directly displayed to user as a text list as shown in FIG. 1, instead, it is further input into a 3D display allocation arranger 3024 which allocates the search result into a 3D space based on the predefined metadata repository 3023.

The 3D allocation arranger 3024 can be implemented in various ways so as to allocate the search result data into a 3D space.

The following descriptions illustrate a 3D space allocation process proposed by the invention.

Figure 5:
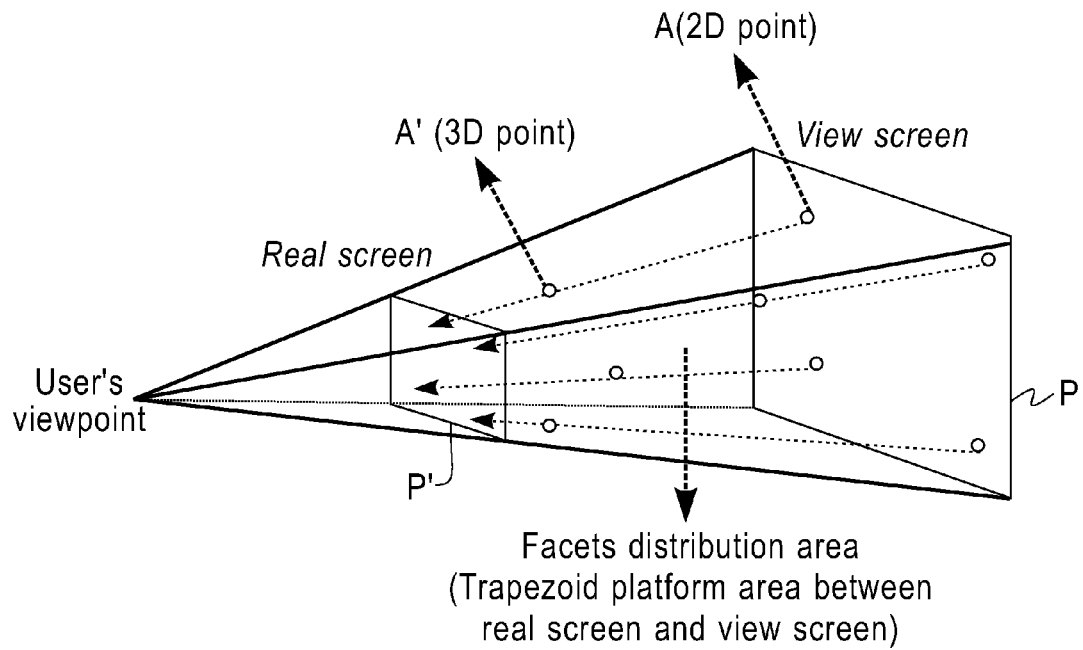
FIG. 5 shows an embodiment of allocating the hierarchical subject labels into a 3D space according to the invention.

Referring to FIG. 5, from the perspective of the user's viewpoint, there is a real screen P', a virtual visual screen P in parallel, and a trapezoid platform 3D space between the two screens. Based on the relationships between subject labels defined in the metadata repository 3023, various known algorithms (e.g., the above-mentioned Spring Algorithm by Eades, P.) may be adopted to generate a 2D view reflecting the relationship between subject labels. Then the 2D view is mapped to a 2D virtual visual screen P so that a subject label is located on the 2D virtual visual screen. In this particular case, for example, a subject label is located on the point A in the screen P. Further, based on the weights of respective subject labels, a value of a distance from the user's viewpoint is assigned to a subject label so that A is further located in the trapezoid platform space as a point A'. If subject labels have different weights, their distances from the user's viewpoint will be different as well. For instance, if the weight is greater, the subject label will be closer to the user's viewpoint, thereby providing a much more intuitive and comfortable experience for users.

In the above 3D allocation process, a 2D view (X-Y) is first generated based on relationship parameters (which could be a 2D matrix M) between subject labels, and then a 3D view is obtained by allocating a third facet coordinate (Z) based on weight parameters of the subject labels (which could be a one-facet vector V).

However, as appreciated by those skilled in the art, there are other ways to realize this process. For example, a 3D visual view can be directly generated based on the relation parameters (2D matrix M) between subject labels and then the visual effects, such as size, color, light or shadow, of subject labels in the 3D space are set based on weight parameters (one facet vector V) of subject labels. (See Kumar, A. and Fowler, R. (1994) "A spring modeling algorithm to position nodes of an undirected graph in three facets", Technical Report, Department of Computer Science, University of Texas.). Alternatively, 3D space coordinates (X, Y, Z) could be calculated directly from relation parameters (2D matrix M) between subject labels and weight parameters (one facet vector V) of subject labels. In short, various ways could be used to map 2D relation parameters and 1D importance parameters (M, V) to (X, Y, Z) in one step or more separate steps. Namely, f(M, V)→(X, Y, Z) can be done by various known algorithms f. Those skilled in the art can select a 3D allocation solution by considering various factors, e.g., complexity of calculations, costs of hardware/software and experience of users.

In one simple way, for example, the user might manually set 3D coordinates for every subject label based on the predefined relationship between subject labels and weights of subject labels so as to directly map a subject label into a 3D space.

It should be noted that the present invention is not limited to any specific algorithm. Nor does the implementation of the embodiments rely heavily upon any specific algorithm. An aspect of the present invention is to allocate facets and hierarchical subject labels into a 3D space so as to visually present more complex information to users. By displaying subject labels, which are allocated into the 3D space based on metadata information, the present invention is able to present more complex information than a list, as shown in FIG. 1. The complex information could be relationships between subject labels, weights of subject labels, etc. Illustration is given with reference to the drawings as follows.

Figure 6:
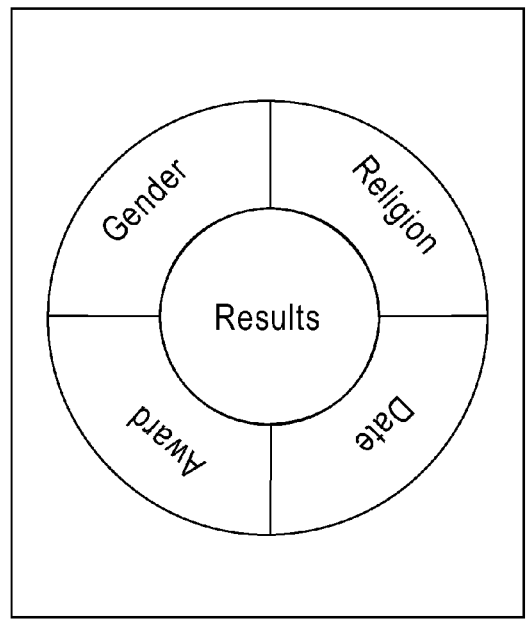
FIG. 6 shows a main menu of Embodiment 1 of the invention.

FIG. 6 shows a main interface of the multi-faceted browsing device of Embodiment 1. The button "Result" (shown as a circle in the center) changes the main interface to a search result page, similar to a "search" button of a search engine page. The surrounding areas represent different facets, e.g. "Region", "Gender", "Award", and "Date". In the following description this main interface is referred to as a facet menu.

Once the user clicks the facet "Region", this operation input is sent to the processing switch 3012 by the user input unit 3011 shown in FIG. 3A. According to the type of user operation input (need to load new data or not), the processing switch 3012 transmits this operation input to the multi-faceted search engine 3021 shown in FIG. 3A. The multi-faceted search engine 3021 searches the resource repository 3022 based on the keyword "Region", and then sends the search results to the 3D display allocation arranger 3024. The search results include subject labels under the facet "Region", such as "Asia", "Europe", "North America", "Latin America", "Pacific", "Africa", etc. Thereafter, according to the above-mentioned 3D allocation process, the 3D display allocation arranger 3024, allocates search results into a 3D space according to relationships between subject labels and weights of subject labels as defined in the metadata repository 3023. The 3D display allocation arranger 3024 presents the resultant 3D space to the display unit 3030. The display unit 3030 displays this 3D space, as illustrated in FIG. 7.

FIG. 7 displays the subject labels of the layer under the facet "Region" in the 3D space, i.e., "Asia", "Europe", "North America", "Latin America", "Pacific", "Africa", etc. The numbers in the parenthesis after the subject labels represent the number of winners in each continent.

If the user further clicks on "Asia (31)", this operation input is also sent to the processing switch 3012 by the user input unit 3011. The processing switch 3012 sends this operation input to the multi-faceted search engine 3021 based on the type of this user operation input, wherein new data need to be loaded. The search engine 3021 searches the resource repository 3022 based on the selection of subject label "Asia" under the "Region" facet. The search results are subject labels under the layer "Asia", i.e., "China", "Korea", "Japan", "Bangladesh" . . . "Vietnam". Thereafter, the search results are sent to the 3D display allocation arranger 3024. The 3D display allocation arranger 3024 allocates the search results into a 3D space according to the relationships between subject labels and the weights of subject labels as defined in metadata repository 3023, and provides the 3D space to the display unit 3030. The display unit 3030 shows this 3D space. As shown in FIG. 8, it displays countries under "Asia" as the subject labels in the 3D space.

In the interface illustrated in FIGS. 7-8, the following complex information can be displayed:
relationships between subject labels: the relationships are presented in terms of the distances between the countries (or continents). For example, in FIG. 8, "Japan", "China" and "Korea" are displayed adjacently because they are geographically adjacent to each other.
weights of subject labels: This property can be defined by users. In the present embodiment, the weight is determined in terms of the number of winners. If the number of winners in one subject label is more than that in another subject label, it will be allocated closer to the user's viewpoint.

As a result, in the 2D real screen, this subject label is displayed bigger.

It should be noted in particular that the relationships between subject labels and the weights of subject labels can be flexibly defined. For example, the relationships between subject labels could be relativity between subject labels measured in terms of the same characteristic. The weights of subject labels could be the degree of importance of the subject labels measured in terms of the same characteristic. The above mentioned relationships between subject labels and weights of subject labels could be predefined in the metadata repository based on demand.

If many subject labels are allocated in the 3D space at the same time, some labels may not be clearly displayed, for example, some labels are too far from the user's viewpoint or are too small. In a further aspect of the present invention, users can use a "zoom in" operation to view the space from a closer viewpoint. The "zoom in" operation by user is sent to the processing switch 3012 through the user input unit 3011 as shown in FIG. 3A. Based on the type of this operation, the processing switch 3012 sends the operation instruction to the 3D layout coordinator 3025, wherein this operation only modifies the shown 3D space view without loading any new content. The 3D layout coordinator 3025 adjusts the 3D space display according to the user's operation. For instance, the 3D view after the adjustment of "zoom in" operation is shown in FIG. 9.

As known by those skilled in the art, various 3D visualized techniques could be applied to adjust the existed 3D space view so as to adapt to the user's viewpoint movement in this virtual 3D space. For example, a new trapezoid platform 3D space can be displayed based on a new user's viewpoint produced by user input. Alternatively, by keeping the user's viewpoint unchanged and adjusting the position and angle of the trapezoid platform 3D space based on user input, an adjusted 3D space could be displayed.

Figure 9:
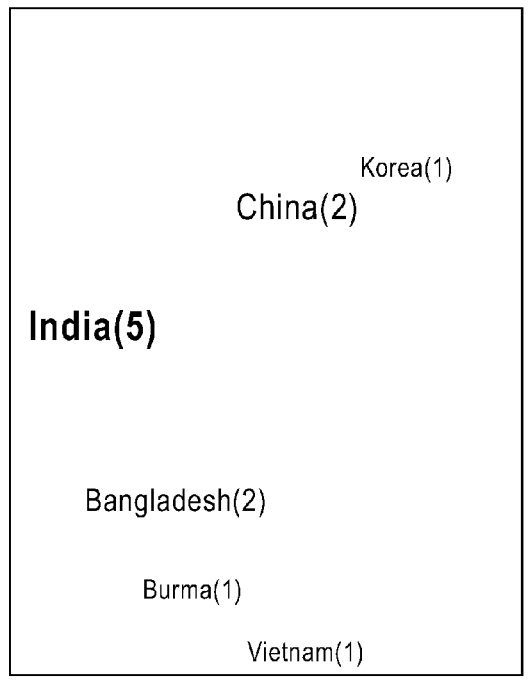
FIG. 9 shows a zoom-in operation to the 3D view of Embodiment 1 of the invention.

After a "zoom in" operation, the user clicks on the subject label "China (2)" in FIG. 9 so as to instruct the expansion of the subject label "China (2)". This user input can be sent to the processing switch 3012 through the user input unit 3011 shown in FIG. 3A. Based on the type of this operation input, the processing switch 3012 sends the user operation input to the multi-faceted search engine 3021 shown in FIG. 3A. The multi-faceted search engine 3021 searches the resource repository 3022 based on the keyword "China", thus the search result is the resource items under the subject label "China", i.e., the two winners in China. Then the search result is sent to the 3D display allocation arranger 3024 which directly allocates the resource items on the screen. In this embodiment, the resource items themselves do not define metadata information. On the other hand, if the resource items have metadata information, the resource items per se are equivalent to the subject labels. After that, resource items are output to the display unit 3030. Therefore, the display unit 3030 displays the resource items. The view after the expansion operation is illustrated in FIG. 10, wherein 2 winners under the subject label "China" are displayed.

Figure 10:
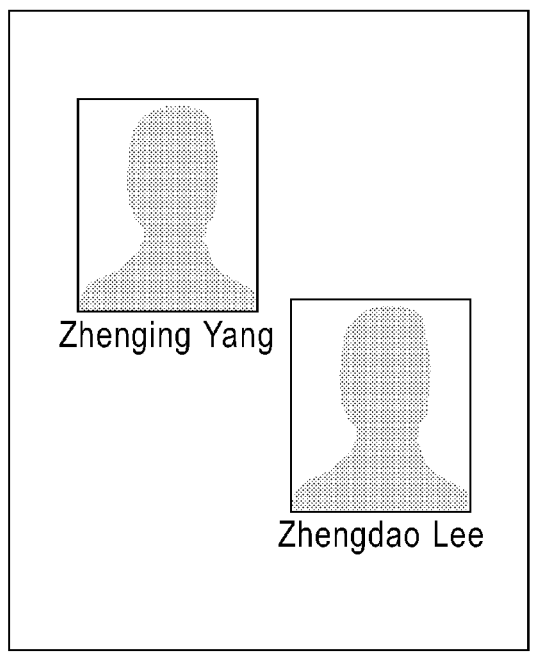
FIGS. 10-11 show resource items of Embodiment 1 of the invention.
Figure 11:
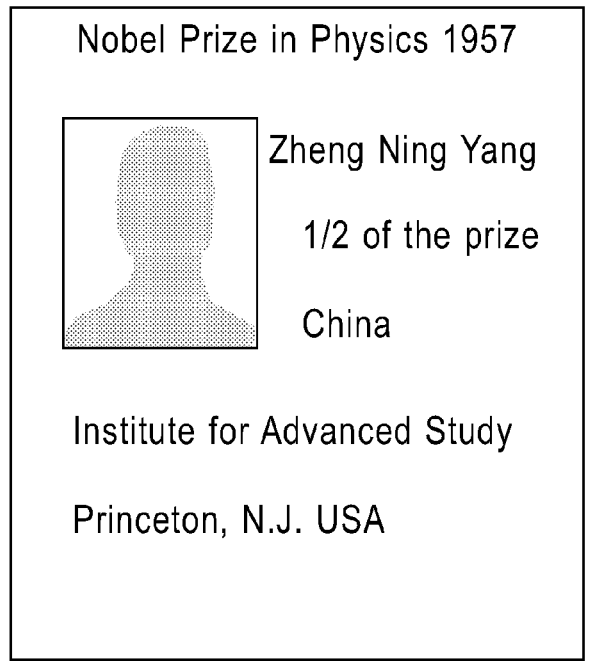

The user can further click on any resource item in FIG. 10 to see details of this resource item, e.g., introductions of winners shown in FIG. 11.

Moreover, the multi-faceted browsing device of one embodiment of the present invention could be further implemented in combination with mp3 and other multimedia files to trigger media players to play the selected mp3 or multimedia files.

Figure 12:
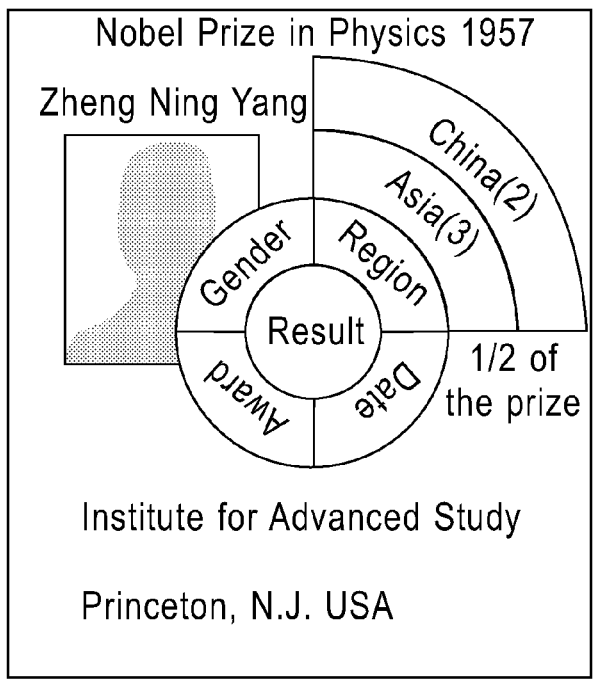
FIG. 12 shows a superposed display of the 3D view and a facet menu of Embodiment 1 of the invention.

In another embodiment, the user may click on a preset button if he/she wants to view the main facet menu. This user operation input can be sent to the processing switch 3012 through the user input unit 3011 shown in FIG. 3A. Based on the type of this operation input, the processing switch 3012 can send this operation input to the 3D layout coordinator 3025. Please note, this operation only superimposes a menu on the display without loading any new content. The 3D layout coordinator 3025 superimposes the main facet menu on the current 3D view, and then outputs it to the display unit 3030. The display unit 3030 displays the facet menu as shown in FIG. 12, which is superimposed on the view of FIG. 11. In one aspect of the present invention, each operation of the user is recorded in a selection history so that the facet menu can further show the selection history of previous operations, e.g., the operations of "Region"→"Asia"→"China".

In one aspect of the present invention, the menu interface of FIG. 12 further allows user to move backward and change the selection history by operating the menu. For example, if the user clicks on the facet menu "Asia (31)", as shown in FIG. 12, to erase the selection of the subject label "China", this user input operation is sent to the processing switch 3012 through the user input unit 3011. The processing switch 3012 can send this operation to the 3D layout coordinator 3025 which retrieves the existing 3D view (as shown in FIG. 8) and superimposes the display operation menu so that the interface as shown in FIG. 13 occurs.

Figure 13:
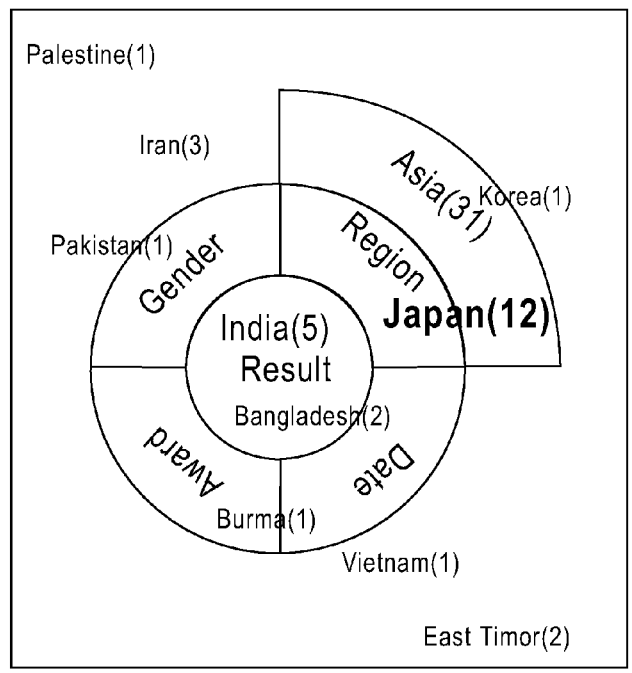
FIG. 13 shows a superposed display of the 3D view and a facet menu of Embodiment 1 of the invention.
Figure 14:
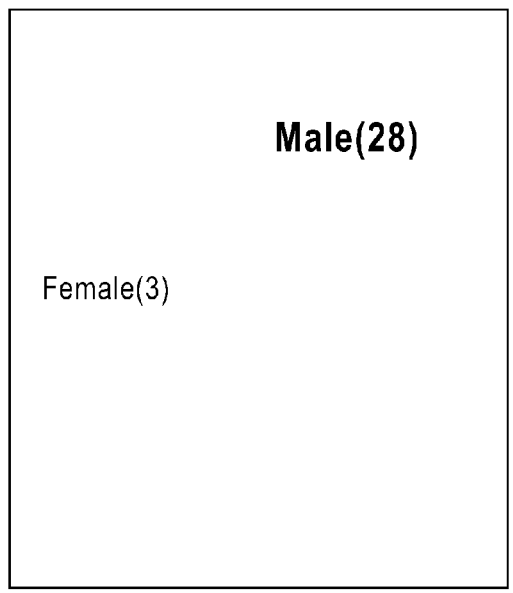
FIGS. 14-15 show a view after facet switching in Embodiment 1 of the invention.

Moreover, if user clicks the "Gender" facet on FIG. 13 to instruct selecting another facet, this user operation input will be sent to the processing switch 3012 through the user input unit 3011 as shown in FIG. 3A. Based on the type of this operation, the processing switch 3012 sends this operation to the multi-faceted searching engine 3021 which further searches the existing search results based on "Gender", and outputs the search results to the 3D display arranger 3024. The 3D display arranger 3024 allocates the new search results to a 3D space as illustrated in FIG. 14. FIG. 14 shows to the user a search based on the combination of the two facets of "Region→Asia" and "Gender". The numbers in the parenthesis after the subject label represent the number of "Male" winners and the number of "Female" winners in "Asia" respectively.

Figure 15:
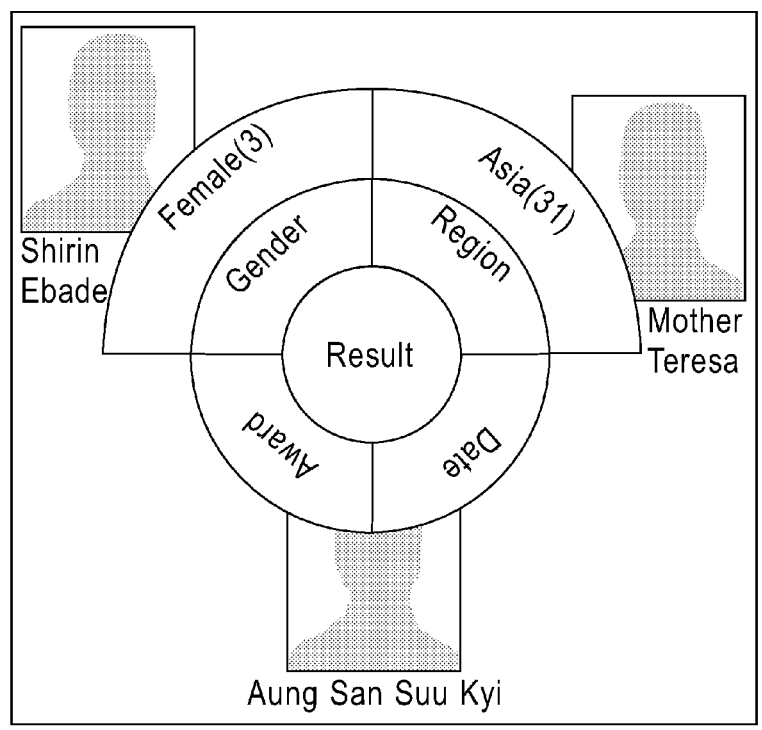

Further, if the subject label "Female", under the facet "Gender", in FIG. 14 is selected, the subject label is expanded. The expanded resource items are displayed in FIG. 15, including 3 female Nobel winners in Asia. Moreover, the main facet menu (which can be triggered by a preset button) is superimposed in FIG. 15. The main facet menu comprises the selection history of "Region→Asia" and "Gender→Female". Thus FIG. 15 shows the resource searched by user and the search history, "Region→Asia" and "Gender→Female", at the same time.

It should be noted that the above mentioned Embodiment 1 is only exemplary. In particular, the metadata defined in the metadata repository including facet hierarchy, relationships between subject labels and weights of subject labels are all predefined by the user based on the data set of Nobel Prize winners.

Actually, in response to any multi-faceted hierarchical data set, the user can define a corresponding metadata information repository so as to display a multi-faceted hierarchical data set in a 3D space view. Embodiment 2 of the present invention is further explained as follows.

Embodiment 2

The 3D multi-faceted browsing device of the present invention is implemented on a song repository in Embodiment 2. The portion similar with Embodiment 1 is omitted. Embodiment 2 can define the following four facets:

Region

Genre

Singer

Date

Based on demand of users, a metadata repository can predefine the following contents:

(1) The hierarchical subject labels under each facet (2) The relationship between subject labels (3) Weights of respective subject labels For example, in Embodiment 2, the subject label under the "Region" facet is "Continent", and the relationships between such subject labels is represented by the distance between the "Continents". For example, the distances between subject labels such as "North America", "South America", and "Europe" correspond to their geographical vicinity. Each "Continent" further includes other subject labels corresponding to respective countries.

Figure 19:
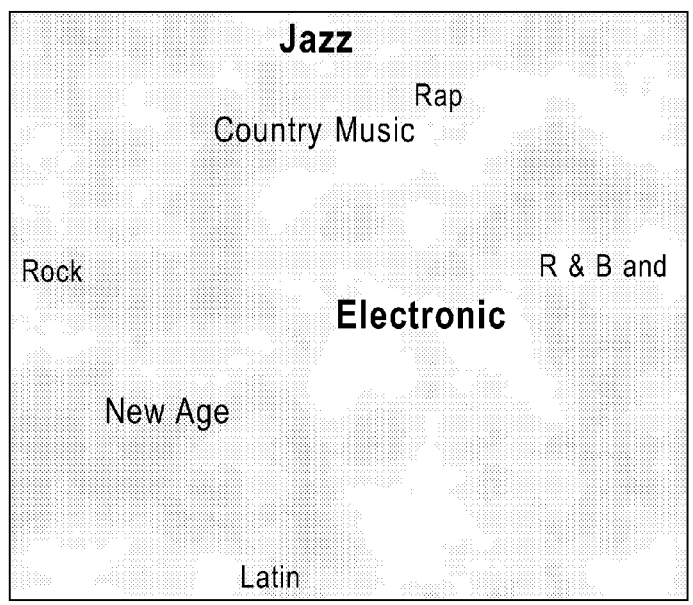
FIG. 19 shows subject labels under both facets "Region→Europe" and "Genres" in the 3D view in Embodiment 2 of the invention.

As shown in FIG. 19, the subject labels under the facet "Genres" are music of various styles, such as "Jazz", "Country Music", "Electronic", "Rap", etc. As shown in FIG. 19, the similarity between genres is represented as the distance between subject labels, i.e., relationships between subject labels.

In Embodiment 2, the "weight" of each subject label is calculated based on the degree of the user's interest (e.g., the frequency of playing). The "weight" can alternatively be calculated based on the number of songs under each subject label or based on the sequence of updating.

The main menu of Embodiment 2 is substantially the same as that of Embodiment 1. The following descriptions illustrate how to browse the song repository based on the multi-faceted browsing device of the present invention.

Figure 16:
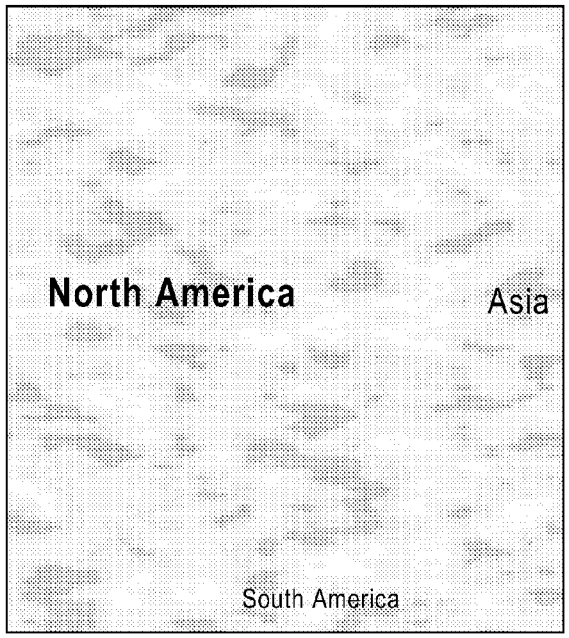
FIG. 16 shows subject labels under facet "Region" in the 3D view in Embodiment 2 of the invention.

First, the user selects the "Region" facet. The user input operation is sent to the processing switch 3012 through the user input unit 3011 in FIG. 3A. The processing switch 3012 sends the user operation input to the multi-faceted searching engine 3021 in FIG. 3A. The multi-faceted searching engine 3021 further searches the resource repository 3022 based on the selection of subject label "Region". The search results are subject labels of the layer under the subject label of "region", i.e., "North America", "South America" and "Europe". Then, the multi-faceted searching engine 3021 transmits the search result to the 3D display allocation arranger 3024. According to the metadata defined in the metadata information repository 3023, the 3D display location arranger 3024 allocates the search results for "Region" into the 3D space and provides the 3D space to the display unit 3030. The display unit 3030 displays this 3D space, as illustrated in FIG. 16. In FIG. 16, a plurality of subject labels, i.e., "North America", "South America" and "Europe" (the sub-subject labels under the facet "Region") are displayed. The distance between subject labels "North America", "South America" and "Europe" corresponds to their geographical vicinity. Moreover, the subject labels "North America", "South America" and "Europe" are assigned different distances to the user's viewpoint according to their weights.

In the 3D space shown in FIG. 16, in the same manner as Embodiment 1, the user can move forward/backward/leftward/rightward using a mouse or keyboard to view the 3D space in a global or local way.

Figure 17:
FIG. 17 shows subject labels under facet "Region→Europe" in the 3D view in Embodiment 2 of the invention.

In the same manner as Embodiment 1, the user can click on a subject label to expand the sub-node thereof. Suppose the user clicks on the subject label "Europe" in FIG. 16, then a new 3D view is generated based on the search results for "Europe". Thus, an expansion view of "Europe" is displayed, as shown in FIG. 17, which displays various countries in "Europe", such as "France", "Greece", "Spain", etc.

Figure 18:
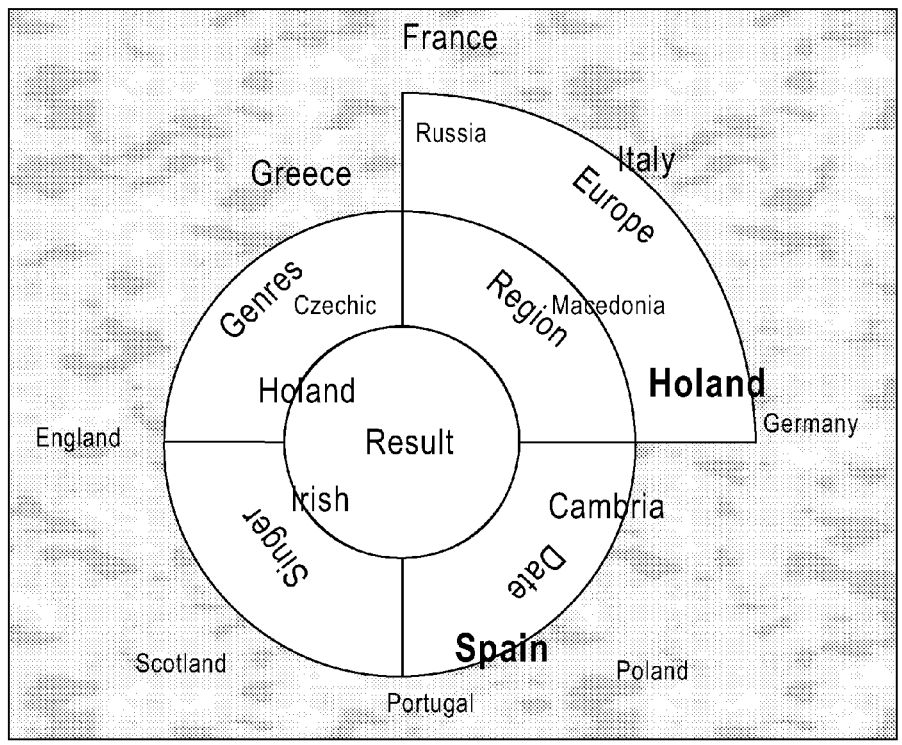
FIG. 18 shows a facet menu view superposed on the subject labels under "Region→Europe" in the 3D view in Embodiment 2 of the invention.

In the same manner as Embodiment 1, the user can trigger a facet operation menu by pressing a preset button. In the view as illustrated by FIG. 18, the facet operation menu is displayed in an overlapping manner on the view of FIG. 17, wherein the previously selected operation history "Region"→"Europe" is also displayed.

The user may switch to other facets by clicking on the operation menu. For example, user clicks "Genres" in the menu of FIG. 18, and a search is further performed for "Genres" in the existing search results (i.e., the search results for "Region"→"Europe"). The newly obtained search results are allocated into the 3D space. As shown in FIG. 19, music of various genres, such as "Jazz", "Country Music", "Electronic", "Rap", etc, are allocated into the 3D space.

It should be noted that the present invention is not limited by the particular visualization of the facet menu. Instead, the operation menu can be displayed in various known ways, e.g., to be displayed as table, list and etc.

Although Embodiments 1 and 2 are data sets of Nobel winners and songs respectively, they are only exemplary. Based the principle as disclosed above, those skilled in the art are able to conceive that the present invention can be applied in processing any data set having a multi-faceted hierarchical structure. This includes displaying, browsing, classifying, and traversing a multi-faceted data set, and visually displaying complex information in the 3D space, e.g., relationships between subject labels under respective facets and weights of subject labels.

It should be noted that some or all steps of the methods of the present invention relate to electronic and/or software application. The application can be a dynamic and flexible process, and thus the method steps can be implemented in other sequences that are different from above-mentioned. Those skilled in the art are able to conceive that the components of the device can be implemented using various programming tools, e.g., machine language, program language, object oriented and/or artificial intelligence techniques, etc. Any suitable digital signal processing circuits, software control processors, special IC or equivalent circuits can also be used to perform the processing mentioned in this description. Components implemented as software are not limited to any specific program language. Instead, the description provides information to those skilled in the art that can be used to produce circuits or software to perform the invention. It should be noted that some or all parts of the present device and method can be implemented as logics mentioned above.

Furthermore, the device and method mentioned in this description can be stored in a computer readable medium. The medium may include but not limited to, ASIC, CD, DVD, RAM, ROM, PROM, disc, signal carrier, memory stick, etc.

Although the present invention is described by referring to the preferred embodiments, it should be appreciated that the present invention is not limited to the specific embodiments as disclosed. The scope of the following claims conforms to the broadest explanation, so as to include all the modifications, equivalent structures and functions.

The invention claimed is:

1. A method for displaying a multi-faceted data set containing hierarchical subject labels, comprising the steps of:
    allocating, using a 3D display arranger device, the subject labels in any subset of the multi-faceted data set into a 3D space based on metadata information of the multi-faceted data set;
    displaying, using a display device, a view of the 3D space into which the subject labels have been allocated;
    wherein the metadata information includes weights of respective subject labels;
    wherein relationships between the subject labels are the degrees of relativity between the subject labels measured in terms of a same characteristic;
    wherein the step of allocating the subject labels into the 3D space further comprises the step of determining distances between the subject labels and a user's viewpoint based on the weights of the subject labels;
    wherein at least one of the steps is carried out using a processor device.

2. The displaying method of claim 1, further comprising the steps of:
    searching the multi-faceted data set based on a user input to produce search result data; and
    taking the search result data as the subset.

3. The displaying method of claim 1, wherein the step of displaying the view of the 3D space further comprises the step of displaying the subject labels together with the related metadata information.

4. The displaying method of claim 1, wherein the step of displaying the view of the 3D space further comprises the step of adjusting a view of the 3D space in response to a moving operation of a user input.

5. The displaying method of claim 1, wherein the metadata information further includes a hierarchy of subject labels of the multi-faceted data set and relationships between respective subject labels of a same layer.

6. An apparatus for displaying a multi-faceted data set containing hierarchical subject labels, comprising:
    a 3D display allocation arranger device for allocating the subject labels in any subset of the multi-faceted data set into a 3D space on the basis of metadata information of the multi-faceted data set;
    a display device for displaying a view of the 3D space into which the subject labels have been allocated;
    a processor device for storing the metadata information;
    wherein the metadata information includes weights of respective subject labels;
    wherein relationships between the subject labels are the degrees of relativity between the subject labels measured in terms of a same characteristic;
    wherein the 3D display allocation arranger determines distances between the subject labels and a user's viewpoint based on the weights of the subject labels.

7. The displaying apparatus of claim 6, wherein the apparatus further comprises:
    a user-input for receiving user input;
    a resource repository for storing the multi-faceted data set containing hierarchical subject labels; and a search engine for searching the resource repository via the user-input unit and outputting a subset of the multi-faceted data set as an output.

8. The browsing apparatus of claim 6, wherein the metadata information further includes a hierarchy of subject labels of the multi-faceted data set and relationships between respective subject labels of a same layer.

9. A method for displaying a multi-faceted data set containing hierarchical subject labels, comprising the steps of:
   allocating, using a 3D display arranger device, the subject labels in any subset of the multi-faceted data set into a 3D space based on metadata information of the multi-faceted data set;
   displaying, using a display device, a view of the 3D space into which the subject labels have been allocated;
   wherein the metadata information includes weights of respective subject labels;
   wherein the weights of the subject labels are the degrees of importance of the subject labels measured in terms of a same characteristic;
   wherein the step of allocating the subject labels into the 3D space further comprises the step of allocating visual effects to the subject labels in the 3D space on the basis of the metadata information;
   wherein at least one of the steps is carried out using a processor device.

10. The displaying method of claim 9, further comprising the steps of:
   searching the multi-faceted data set based on a user input to produce search result data; and
   taking the search result data as the subset.

11. The displaying method of claim 9, wherein the step of displaying the view of the 3D space further comprises the step of displaying the subject labels together with the related metadata information.

12. The displaying method of claim 9, wherein the step of displaying the view of the 3D space further comprises the step of adjusting a view of the 3D space in response to a moving operation of a user input.

13. The displaying method of claim 9, wherein the metadata information further includes a hierarchy of subject labels of the multi-faceted data set and relationships between respective subject labels of a same layer.

14. An apparatus for displaying a multi-faceted data set containing hierarchical subject labels, comprising:
   a 3D display allocation arranger device for allocating the subject labels in any subset of the multi-faceted data set into a 3D space on the basis of metadata information of the multi-faceted data set;
   a display device for displaying a view of the 3D space into which the subject labels have been allocated;
   a processor device for storing the metadata information;
   wherein the metadata information includes weights of respective subject labels;
   wherein the weights of the subject labels are the degrees of importance of the subject labels measured in terms of a same characteristic;
   wherein the 3D display allocation arranger further determines a visual effect of the subject labels in the 3D space on the basis of the metadata information.

15. The browsing apparatus of claim 14, wherein the apparatus further comprises:
   a user-input for receiving user input;
   a resource repository for storing the multi-faceted data set containing hierarchical subject labels; and
   a search engine for searching the resource repository via the user-input unit and outputting a subset of the multi-faceted data set as an output.

16. The browsing apparatus of claim 14, wherein the metadata information further includes a hierarchy of subject labels of the multi-faceted data set and relationships between respective subject labels of a same layer.

* * * * *